(12) United States Patent
Kaner et al.

(10) Patent No.: US 6,479,028 B1
(45) Date of Patent: Nov. 12, 2002

(54) RAPID SYNTHESIS OF CARBON NANOTUBES AND CARBON ENCAPSULATED METAL NANOPARTICLES BY A DISPLACEMENT REACTION

(75) Inventors: Richard B. Kaner, Santa Monica, CA (US); Jennifer L. O'Loughlin, Portland, OR (US); Ching-Hwa Kiang, Los Angelos, CA (US); Charles H. Wallace, Portland, OR (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/541,814

(22) Filed: Apr. 3, 2000

(51) Int. Cl.[7] .............................................. C01B 31/00
(52) U.S. Cl. ................ 423/414; 423/447.1; 423/447.2; 252/502; 252/503
(58) Field of Search ............................ 423/447.2, 448, 423/447.1, 414; 428/34.1, 299.1, 398, 408, 903; 252/502, 503

(56) References Cited

U.S. PATENT DOCUMENTS

| | | | |
|---|---|---|---|
| 5,110,768 A | 5/1992 | Kaner et al. .................... 501/1 |
| 5,456,986 A | 10/1995 | Majetich et al. ............. 428/403 |
| 5,457,343 A * | 10/1995 | Ajayan et al. ............... 257/734 |
| 5,472,749 A | 12/1995 | Dravid et al. ................ 427/580 |
| 5,474,591 A | 12/1995 | Wells et al. .................. 75/351 |
| 5,578,543 A | 11/1996 | Tennent et al. .............. 502/180 |
| 5,589,152 A * | 12/1996 | Tennent et al. ............ 423/447.2 |
| 5,641,466 A * | 6/1997 | Ebbesen et al. ........... 423/447.2 |
| 5,707,916 A | 1/1998 | Snyder et al. ............... 502/180 |
| 5,716,708 A | 2/1998 | Lagow .......................... 428/408 |
| 5,747,161 A | 5/1998 | Iijima .......................... 428/367 |
| 5,780,101 A | 7/1998 | Nolan et al. ................. 427/216 |
| 5,783,263 A | 7/1998 | Majetich et al. ............. 427/580 |
| 5,814,370 A | 9/1998 | Martino et al. ......... 427/213.35 |
| 5,834,057 A | 11/1998 | Edelstein et al. ............ 427/212 |
| 5,850,064 A | 12/1998 | Goldstein ................. 204/157.4 |
| 5,851,417 A * | 12/1998 | Hung ....................... 252/62.55 |
| 5,869,626 A | 2/1999 | Yamamoto et al. ........... 534/10 |
| 6,183,714 B1 * | 2/2001 | Smalley et al. .......... 423/447.3 |

OTHER PUBLICATIONS

Gillan, E.G., et al., Chem. of Mater., vol. 8:333–343 (1996) ; No. 2 Feb. 1996.

Wiley, J.B., et al., Science, Vol. 255:1093–1097 (1992) Feb. 28, 1992.

* cited by examiner

*Primary Examiner*—Stanley S. Silverman
*Assistant Examiner*—Timothy C. Vanoy
(74) *Attorney, Agent, or Firm*—Fulbright & Jaworski L.L.P.

(57) ABSTRACT

Carbon material having at least a partially curved structure, such as a nanotube, produced by a displacement reaction in which a carbon halide, e.g. $C_2Cl_6$, is reacted with a metal compound, e.g., lithium acetylide in the presence of a catalyst, e.g., $CoCl_2$. Some applications of the nanotubes of the present invention are use in magnetic data storage media, or use as conductors or semiconductors.

17 Claims, 2 Drawing Sheets

RAPID SYNTHESIS OF CARBON NANOTUBES AND CARBON ENCAPSULATED METAL NANOPARTICLES BY A DISPLACEMENT REACTION

STATEMENT REGARDING FEDERALLY SPONSORED RESEARCH OR DEVELOPMENT

This invention was made with Government support under Grant No. 9704964, awarded by the National Science Foundation. The Government has certain rights in this invention.

BACKGROUND OF THE INVENTION

1. Field of the Invention

The invention relates generally to displacement reactions for synthesis of carbon nanotubes and metal encapsulated within a carbon lattice structure.

2. Description of Related Art

Pure carbon has many allotropes, such as: diamond; graphite; fullerenes; and nanotubes, each being stable in different temperature and pressure ranges. Fullerenes are a family of closed caged molecules formed entirely of carbon in the $sp^2$-hybridized state and constitute a third form of carbon after diamond and graphite. These spherical, cavity containing molecules and their allotropes have been found to possess remarkable properties, and the most stable one known as buckminsterfullerene or $C_{60}$ has been widely investigated.

In 1991 Sumio Iijima synthesized, through the use of an arc discharge method, new carbon structures in the form of needle-like tubes or rolled-up graphite sheets with multiple concentric cylindrical shells of hexagonally bonded carbon atoms. These extended fullerene tube structures have been called carbon nanotubes, more specifically multi-walled nanotubes (MWNTs), having a thickness of several carbon atom layers and typical outside diameters from a few to several tens of nanometers. A variation of the arc discharge method, using two graphite rods of different diameters, has also been reported to produce MWNTs. [Ebbeson, T. W., et al., Nature, Vol. 358:220–222 (1992)]. MWNTs can also be synthesized by catalytic decomposition of hydrocarbons on metal surfaces. [Rodriguez, N. M., et al., Langmuir, Vol., 11:3862–3866 (1995)].

In 1993 it was discovered that the use of transition metal catalysts during arc discharge produced single walled nanotubes (SWNTs) [Bethune, D. S., et al., Nature, Vol. 363:605–607 (1993), Iijima, S., et al., Nature, Vol. 363:603–605 (1993)]. Kiang, C-H. et al., described the synthesis of SWNTs with a metal catalyst [Kiang, C.-H., et al., J. Phys. Chem. Solids, Vol. 57:35–39 (1995); Kiang, C.-H., et al., J. Phys. Chem., Vol. 98: 6612–6618 (1994); Kiang, C.-H., et al., Carbon, Vol. 33:903–914 (1995); Kiang, C.-H., et al., Chem. Phys. Left., Vol. 259:41–47 (1996)].

SWNTs have been generated by arc-evaporation in the presence of a cobalt catalyst [Bethune, D. S., et al., Nature, Vol. 363:605–607 (1993) and Ijima, S., et al., Nature, Vol. 363:603–605 (1993)]. A recent modification of this arc-evaporation method has been reported to enable SWNT synthesis in larger yields [Journet, C., et al., Nature, Vol. 388:756–758 (1997)]. SWNTs are also produced by laser-vaporization of a graphite, cobalt, and nickel mixture at 1200° C. [Guo, T., et al., Chem. Phys. Lett., Vol. 243:49–54 (1995)]. This method was optimized to reportedly give 70% yield [Thess, A., et al., Science, Vol. 273:483–487 (1996)]. More recently, SWNTs were synthesized by the Thess et al., method without the assistance of oven heating [Maser, W. K., et al., Chem. Phys. Left., Vol. 292:587–593 (1998)]. SWNTs are also produced by thinning of MWNTs using $CO_2$ by pyrolysis of the hydrocarbon [Cheng, H. M., et al., Appl. Phys. Left., Vol. 72:3282–3284], and by chemical vapor deposition [Hafner, J. H., et al., Chemical Physics Letters, Vol. 296:195–202 (1998)].

It has been reported that hydrogen gas can condense inside SWNTs [Dillon, A. C., et al., "Storage of hydrogen in single-walled carbon nanotubes", Nature, Vol. 386:377–379 (1997)], and that elongated crystallites of Ru were encapsulated in SWNTs [Sloan, J., et al., The opening and filling of single walled carbon nanotubes (SWNTs), Chem. Commun., Vol. 3: 347–348 (1998)]. Metal nanoparticles have been reported to be encapsulated in graphite layers by a modified arc evaporation method [Jiao, J., et al., Journal of Applied Physics, Vol. 80:103–108 (1996)]. Nanoparticles suitable for magnetic recording media, synthesized via the arc-evaporation method, have been described in U.S. Pat. No. 5,456,986 to Majetich, et al., and U.S. Pat. No. 5,783, 263 to Dravid, et al. U.S. Pat. No. 5,780,101 to Nolan, et al., described a method for producing encapsulated nanoparticles and carbon nanotubes using catalytic disproportionation of carbon monoxide.

Nanotubes are superstrong and lightweight and can act as either a conductor or a semiconductor depending on the inner diameter and chirality of the hexagonal carbon lattice along the length of the nanotube. See, Dekker, C., "Carbon Nanotubes as Molecular Quantum Wires", Physics Today, Vol. 52:22–28 (1999), Ebbeson, T. W., "Carbon Nanotubes", Physics Today, Vol. 49:26–32 (June 1996). Based on their size and weight, nanotubes have novel electrical, optical, magnetic, and thermal properties. See, Han, S., et al., Science, Vol. 277:1287 (1997); Vietze, U., et al., "Zeolite-Dye Microlasers", Phys. Rev. Lett., Vol. 81:4628–4631 (1998); Service, R. F., Science, Vol. 281:940–942 (1998); and Heremans, J., et al., "Magnetoresistance of bismuth nanowire arrays: A possible transition from one-dimensional to three-dimensional localization," Phys. Rev. B 58: R10091 (1998).

Some of the many potential applications of nanotubes include: molecular electronics [Tans, S. J., et al., "Room-temperature transistor based on a single carbon nanotube", Nature, Vol. 393: 49–52 (1998)], hydrogen storage media [Dillon, A. C., et al., "Storage of hydrogen in single-walled carbon nanotubes", Nature, Vol. 386: 377–379 (1997)], and scanning probe microscope tips [Wong, S. S., et at., "Covalently functionalized nanotubes as nanometer-sized probes in chemistry and biology," Nature, Vol. 394: 52–55 (1998)]. Nanotubes can be created with acidic functionality or with basic or hydrophobic functionality, or with biomolecules at the open tip ends. Macro-applications include lightweight, strong wires, batteries, fuel cells, or bulletproof vests. Biological applications include an open-ended nanotube that could inject a few molecules into a specific region of a cell to carry out molecular surgery on nucleic acids [Yakobson, B., et al., "Fullerene Nanotubes: $C_{1,000000}$ and Beyond," American Scientist, Vol. 85:324–337 (1997)]. These applications are but a few of the applications requiring strong, small diameter nanotubes. Also, Co, Fe, and Ni are magnetic metals and are of interest as magnetic data storage media.

Solid-state metathesis (SSM) reactions have been reported to be a rapid route to many solid-state materials including chalcogenides, nitrides, borides, phosphides and intermetallics [Gillan, E. G., et al., Chem. of Mater., Vol. 8:333–343 (1996); U.S. Pat. No. 5,110,768 to Kaner, et al.; and Wiley, J. B., et al., Science, Vol. 255:1093–1097

(1992)]. A solution phase process for the synthesis of Group III-V semiconductor nanocrystals has also been reported [U.S. Pat. No. 5,474,591 to Wells, et al.].

It has been reported that MWNTs, grown in the vapor phase, are being produced on the kilogram scale daily, but little is known about the possibility to further scale-up this method. There is no comparable method for the bulk synthesis of SWNTs [Service, R. G., supra.] or of metal encapsulated within a carbon lattice structure. Furthermore, despite the development of SWNT production, the current cost of purified SWNTs is prohibitive, in the range of $1000 per gram.

BRIEF SUMMARY OF THE INVENTION

The present invention overcomes drawbacks of the foregoing methods to rapidly prepare carbon material, having at least a partially curved structure, and/or encapsulated metal within a carbon structure. By partially curved structure is meant having a non-flat carbon based structure, such as found in nanotubes. An advantage of the present invention is an increase in yield as the reaction is scaled up.

The invention comprises a displacement reaction, preferably a double displacement (solid-state metathesis (SSM)) reaction in which a carbon compound, such as a hydrocarbon, halogenated hydrocarbon, or halogenated carbon compound and a metal compound are metathetically reacted in the presence of a catalyst, using heat to initiate the reaction, which is otherwise exothermic, to provide a highly efficient, inexpensive and readily scalable route to MWNTs, SWNTs, and metal encapsulated within a carbon lattice structure.

In particular the carbon compound preferably has the formula $R_nX_yH_z$, wherein R is carbon, n is a number from 1 to a million or more, preferably 1 to 1000, preferably still 1 to 100; X is selected from the halide group consisting of fluorine, chlorine, bromine, and iodine, y is 0 to a million or more; H is hydrogen, z is 0 to a million or more and the ratio of y to z represents the degree of halogenation of the hydrocarbon; the metal compound is represented by $M_{x'}R_{y'}$, wherein M is any of the Group 1, 2, or 13 metal ions capable of forming a salt; R is carbon, x' is any integer, preferably a number from 1 to 3, y' is a number from 0 to a million or more, preferably 0–3, preferably still, x'=y'=2. Preferably the metal compound is lithium acetylide. he catalyst is preferably a transition metal catalyst, such as $CoCl_2$, $NiCl_2$, or $FeCl_3$ or an organometallic metal. Heat to initiate the exothermic reaction can be provided from any conventional source, for example, a heated wire.

The displacement reaction of the present invention uses inexpensive precursors, requires less preparation, and less expensive equipment than existing methods. The reaction also produces nanoparticles comparable in size to those synthesized by modified arc evaporation. Thermodynamic reaction parameters such as maximum reaction temperature and exothermicity can be altered by changing reactants, (for example, from halogenated carbon compounds to halogenated hydrocarbons or pure hydrocarbons) reaction size, or the addition of inert salts, or combinations thereof. These parameters, in conjunction with the type of catalyst and gas atmosphere used, enables the optimization of nanotube yield. Also, the nanotube yield increases with increasing reaction size.

These and other features, aspects, and advantages of the present invention will become better understood with regard to the following detailed description, appended claims, and accompanying drawings.

DETAILED DESCRIPTION OF THE INVENTION

Figure 1:
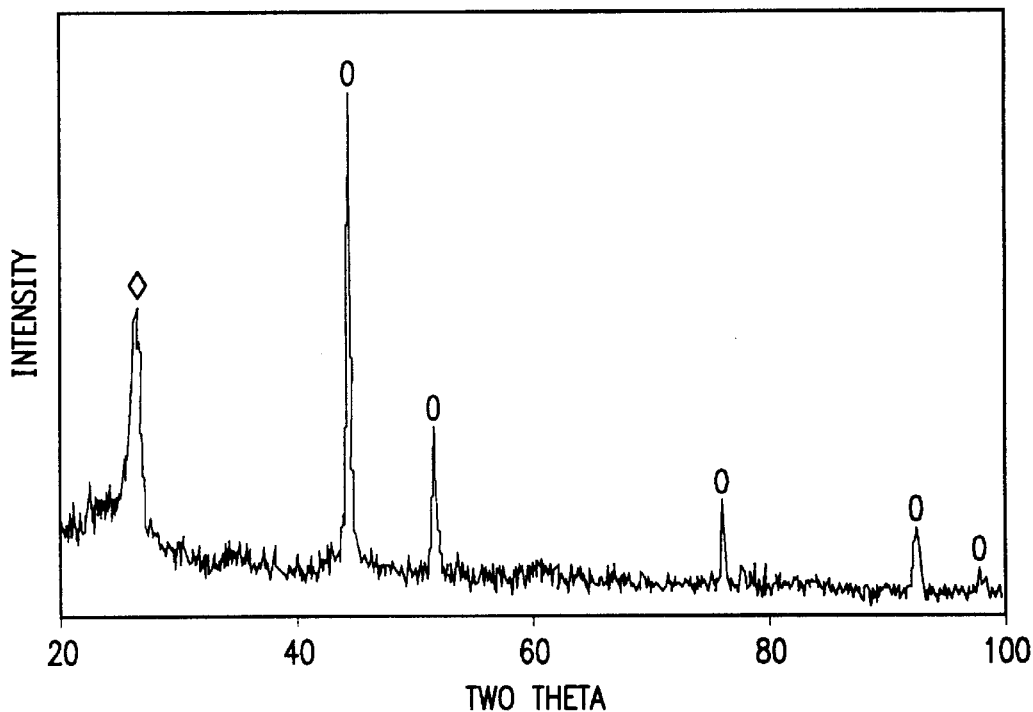
FIG. 1 is a powder X-ray diffraction pattern of the reaction between $C_2Cl_6$ and $Li_2C_2$ with the addition of 5 mole % $CoCl_2$.

The present invention relates to a method for the high yield synthesis of carbon nanotubes and metal encapsulated within a carbon lattice structure. The reaction is a rapid, self-propagating, double-displacement or metathesis reaction involving a carbon compound, such as a halogenated carbon compound, a halogenated hydrocarbon or a hydrocarbon, with a metal or metal carbon compound in the presence of a catalyst. The reaction is performed at an ambient temperature with stoichiometric amounts of well-mixed reactant powders in a stainless steel reaction vessel. The reaction is initiated by an ignition source such as a resistively heated nichrome wire (T≈1100 K), after which the reaction becomes self-propagating and produces the desired material along with salt by-products (e.g. LiCl, NaCl).

In general, the displacement or metathesis reaction is highly exothermic due to the formation of very stable salt by-products. The heated wire initiates the chemical reaction, which then becomes self-propagating. Although the exothermic reaction is conveniently initiated by the heated wire, other heating methods can be used: external methods, such as direct heating of the walls of the container with heating tape, flames, or lasers; or internal methods, such as the use of microwave energy or friction such as ball milling. Although the reaction took place in a steel reaction vessel, other containers can be used such as glass ampoules. The reaction container could be open as well as closed. The salt by-products are easily removed by washing with water or alcohol allowing for the isolation of the desired product, carbon nanotubes and/or graphite encapsulated metal. The method can be described by reference to the following:

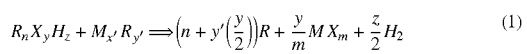

$$R_nX_yH_z + M_{x'}R_{y'} \Longrightarrow \left(n + y'\left(\frac{y}{2}\right)\right)R + \frac{y}{m}MX_m + \frac{z}{2}H_2 \qquad (1)$$

wherein
R is carbon, n is a number from 1 to a million or more, preferably 1 to 1000, preferably still 1 to 100; X is selected from the halide group consisting of fluorine, chlorine, bromine, and iodine, y is 0 to a million or more; H is hydrogen, z is a number from 0 to a million or more; $M_{x'}R_{y'}$ is a metal compound capable of forming a salt, M is any of the Group 1, 2, or 13 metal ion capable of forming a salt; x' is a number from 1 to a million or more, preferably 1 to 3; y' is a number from 0 to a million or more, preferably 0 to 3, most preferably x'=y'=2; and m is a number from 1 to a million or more, preferably 1 or 2. Preferably the carbon compound is hexachloroethane and the metal compound is lithium acetylide.

All reactants used were anhydrous. The reactions were performed in an inert atmosphere of helium, although other gases could be used. An inert atmosphere is not necessary, but a dry atmosphere will keep water from reacting with and decomposing the precursors. The following examples were performed in a helium filled drybox, in which the steel reaction container was located.

The addition of the transition metal catalyst $CoCl_2$ to the reaction mixture leads to the production of MWNTs, SWNTs, and Co metal encapsulated in graphite. The addition of other transition metal catalysts such as: $NiCl_2$ or $FeCl_3$ to the reaction mixture leads to the production of MWNTs and Ni or Fe metal, respectively encapsulated in a carbon lattice structure. No SWNTs were seen in samples that did not have the $CoCl_2$ catalyst in the starting reactant mixture. Any free cobalt, nickel, or iron formed in this reaction can be removed by washing in a strong concentrated acid, for example sulfuric, nitric, or hydrochloric acid. Without the addition of the catalyst, the reaction results only in crystalline, layered graphite. By decreasing the amount of $CoCl_2$ added, for example from 5 mole percent to 2 mole percent, the yield of SWNTs decreases significantly while the yield of MWNTs and graphite encapsulated Co metal remained fairly constant. The ideal amount of $CoCl_2$ catalyst for producing SWNTs is 5 mole percent. Overall nanotube yield (both SWNTs and MWNTs) increases with increasing reaction size.

The yield of Co, Ni, or Fe metal encapsulated in graphite can be increased by increasing the amount of $CoCl_2$, $NiCl_2$, or $FeCl_3$ catalyst from 5 mole % to 10 mole %. Analysis of the products by TEM indicates that at this catalyst concentration, metal nanoparticles encapsulated in graphite are greatly favored over nanotubes. In addition, any unfavorable by-products, such as free graphite or free metal can be removed by washing in a strong, concentrated acid such as concentrated sulfuric, nitric or hydrochloric acid. Surprisingly, the nanoparticles of Co, Ni, or Fe encapsulated in the carbon lattice structure were unaffected by the acid, indicating that they are totally encapsulated, as seen in FIG. 2c. Open sheets of graphite and free metal, however, are readily dissolved. Furthermore, the carbon encapsulated cobalt, nickel or iron nanoparticles are stable for extended periods of time (at least 2 weeks and likely indefinitely) in concentrated nitric acid.

The use of different reactants or the addition of inert salt additives such as NaCl or LiCl, can alter the reaction temperature and exothermicity of each reaction. The maximum reaction temperature of the reaction of Example 1 is calculated to be in excess of 2000° C., which is several hundred degrees higher than the normal reaction temperature used previously to produce SWNTs [Guo, T., et al., supra]. The driving force in solid-state metathesis reactions is the formation of the very stable salt by-product. The more moles of salt produced in a reaction, the more exothermic a given reaction. By increasing the moles of carbon produced per mole of salt, the reaction exothermicity decreases thereby lowering the maximum reaction temperature as calculated assuming complete reaction at adiabatic conditions.

For example, if the number of carbons, n, is increased from 1 to 100 in the following reaction:

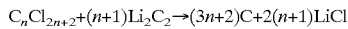

$$C_nCl_{2n+2}+(n+1)Li_2C_2 \rightarrow (3n+2)C+2(n+1)LiCl$$

less LiCl salt is produced with respect to moles of carbon and the maximum temperature can be lowered by 60° C. (from 2029 to 1969° C.). By increasing the number of carbons, n to 1000, the effect on the maximum reaction temperature diminishes and the maximum reaction temperature drops by only an additional 1° C. Thus, increasing the length of the carbon chain in the halogenated carbon compound decreases the maximum reaction temperature.

A more dramatic effect on the maximum reaction temperature is achieved by using a halogenated hydrocarbon, $C_nCl_xH_y$. If the number of carbons, n, is held constant (n=1000):

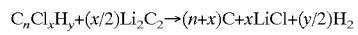

$$C_nCl_xH_y+(x/2)Li_2C_2 \rightarrow (n+x)C+xLiCl+(y/2)H_2$$

and the ratio of y to x is increased from 0 to 6, the maximum reaction temperature is predicted to drop by 925° C. (from 1968 to 1043° C.). These temperatures are well within the temperature range in which SWNTs are synthesized. Similar effects are seen with carbon fluorides, $C_nF_xH_y$ in the following reaction with lithium acetylide:

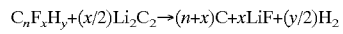

$$C_nF_xH_y+(x/2)Li_2C_2 \rightarrow (n+x)C+xLiF+(y/2)H_2$$

If the number of carbons, n is held constant (n=1000) and the ratio of y to x is increased from 0 to 6, the reaction temperature drops by 384° C. (from 1584 to 1200° C.). The lower temperatures are again well within the temperature range in which SWNTs are synthesized.

Long-chain halogenated hydrocarbons, such as the polymers, polyvinylchloride and polyvinylidene chloride are promising precursors in solid state metathesis reactions. By lowering the maximum reaction temperature and exothermicity, the yield of MWNTs to SWNTs to other by-products can be altered and optimized. The ability to alter these parameters makes the displacement reaction, preferably the double displacement reaction a useful method for synthesizing carbon materials.

In order to synthesize carbon nanotubes, both single-walled and multi-walled, as well as carbon encapsulated metal, a variety of carbon producing reactions were used. Both SSM reactions (also known as double displacement reactions) and single displacement reactions were used.

In the following examples, X-ray diffraction and TEM studies were carried out to characterize the synthesized samples.

EXAMPLE 1

In this example 0.0078 moles of lithium acetylide ($Li_2C_2$) was reacted with 0.0026 moles of hexachloroethane ($C_2Cl_6$) in the presence of 0.0011 moles (5 Mole % based on C) of $CoCl_2$ catalyst as given in equation (2).

$$C_2Cl_6+3Li_2C_2 \rightarrow 8C+6LiCl \quad (2)$$

All reactants were mixed simultaneously and completely, using an agate mortar and pestle, until the individual reactants were no longer visible. The mixing time was approximately 5 minutes. The reactants were placed in a steel container and placed in contact with a nichrome wire. Current was passed through the wire for approximately a few seconds, causing the wire to be resistively heated. The heat from the wire initiated the reaction, which was otherwise exothermic. The reaction went to completion in less than 1 second. Products were washed in deionized water to remove any salt by-products and dried in air.

RESULTS

The powder X-ray diffraction pattern of the products of reaction (2) with the $CoCl_2$ catalyst indicated the formation of polycrystalline graphite, as seen by the peak at 26 degrees two theta in FIG. 1, and cubic cobalt metal. This peak is representative of the interplanar spacing of carbon-carbon layers. The most crystalline graphite was found in this example. Upon further investigation by TEM, many nanophase materials were found. These nanophase materials comprised MWNTs, SWNTs, as well as cobalt nanoparticles encapsulated within graphitic shells. Nanotubes (both SWNTs and MWNTs) comprised between approximately 10% to 20% by volume, of the total yield of product. The remainder of the sample yield was metal nanoparticles encapsulated with a carbon lattice structure. The greatest number of SWNTs were synthesized using 5 Mole % $CoCl_2$ catalyst, as seen in FIG. 2b.

Figure 2A:
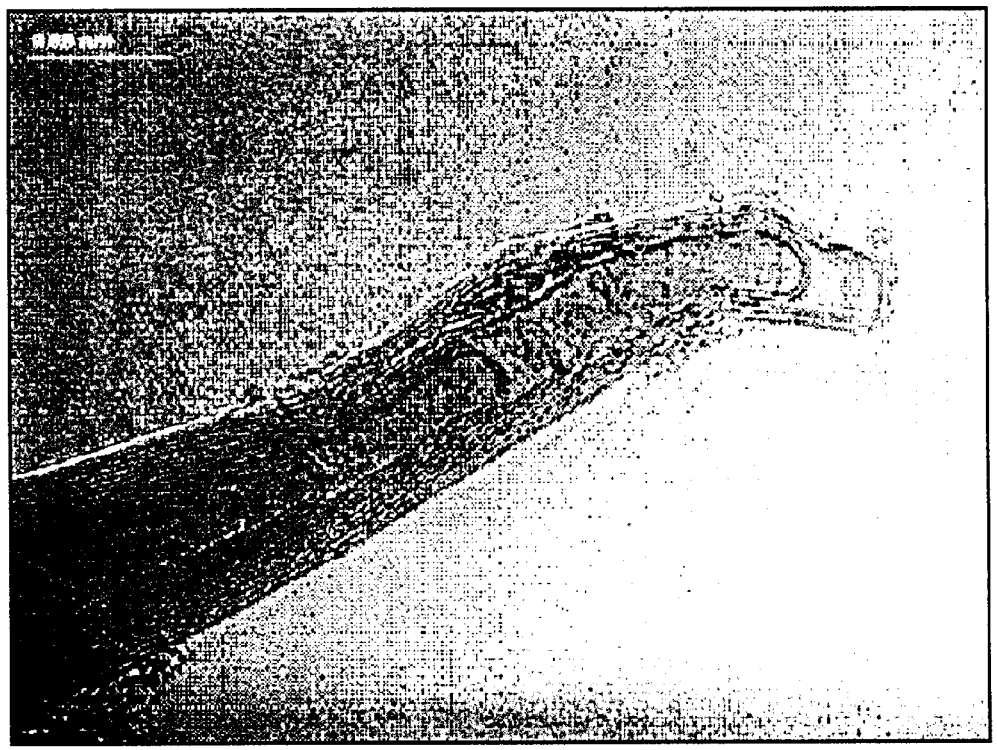
FIGS. 2a–c are transmission electron microscopy (TEM) images of the reaction between $C_2Cl_6$ and $Li_2C_2$ with the addition of 5 mole % $CoCl_2$, where single-walled (FIG. 2a), multi-walled (FIG. 2b), and cobalt nanoparticles encapsulated in graphite layers (FIG. 2c), were produced.
Figure 2B:
Figure 2C:
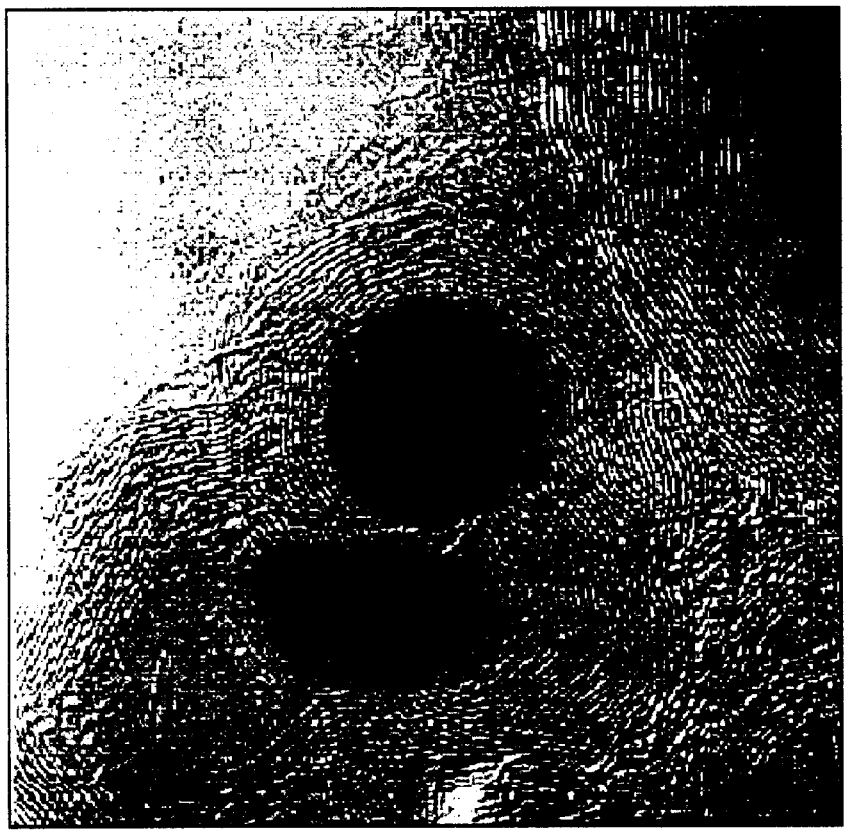

As seen in the TEM image of FIG. 2a, some of the MWNTs extended up to 50 nm or more in length and possessed a bamboo-like structure. The distance between the layers in the MWNTs was 0.34 nm (3.4 Å), as expected for carbon-carbon layers. The SWNTs, as seen in FIG. 2b, appeared to grow from a graphite and amorphous carbon mix and were about 2.9 nm in diameter and approximately 10 nm in length. Cobalt nanoparticles were also found to be encapsulated in layers of a carbon lattice structure, as seen in FIG. 2c. These nanoparticles were found to be stable with respect to oxidation by air or concentrated nitric acid, indicating the that graphitic shells were closed.

EXAMPLE 2

The procedures of Example 1 were followed by substituting 2 Mole % $CoCl_2$ for the 5 Mole % $CoCl_2$.

RESULTS

The powder X-ray diffraction pattern of the products of reaction (2) with 2 Mole % $CoCl_2$ catalyst indicated the formation of polycrystalline graphite and cubic cobalt metal. Upon further investigation by TEM, many nanophase materials were found. These nanophase materials comprised MWNTs, SWNTs, as well as cobalt nanoparticles encapsulated within layers of a carbon lattice structure. The yield of SWNTs decreased significantly and the yield of MWNTs and Co nanoparticles encapsulated in graphitic shells remained fairly constant.

EXAMPLE 3

The procedures of Example 1 were followed by substituting 4 Mole % $CoCl_2$ for the 5 Mole % $CoCl_2$ and the reaction scale was decreased to 1/10th the original size.

RESULTS

TEM indicated that the overall nanotube yield decreases significantly. Thus, nanotube yield is dependent on reaction size such that the yield of nanotubes increases with increasing reaction size.

EXAMPLE 4

The procedures of Example 1 were followed by substituting 10 Mole % $CoCl_2$ for the 5 Mole % $CoCl_2$.

RESULTS

The powder X-ray diffraction pattern of the products of reaction (2) with 10 Mole % $CoCl_2$ catalyst indicated the formation of polycrystalline graphite and cubic cobalt metal. Upon further investigation by TEM, nanophase materials were found to comprise MWNTs and cobalt nanoparticles encapsulated within layers of a carbon lattice structure.

EXAMPLE 5

The procedures of Example 1 were followed by substituting an approximately equal molar amount of 5 mole % $NiCl_2$ for the 5 mole % $CoCl_2$.

RESULTS

TEM studies indicated that the products consisted of MWNTs and Ni nanoparticles encapsulated in graphitic shells. The Ni nanoparticles were similar to the Co nanoparticles formed when the $CoCl_2$ was used. They were spherical in shape and encapsulated completely in graphitic shells.

EXAMPLE 6

The procedures of Example 5 were followed by substituting 10 mole % $NiCl_2$ for the 5 mole % $NiCl_2$.

RESULTS

TEM indicated that by increasing the percentage of $NiCl_2$ catalyst from 5 to 10%, the yield of Ni nanoparticles encapsulated in graphitic shells increased. The yield of nanotubes remained fairly constant.

EXAMPLE 7

The procedures of Example 1 were followed by substituting 2 mole % of $FeCl_3$ for 5 mole % $CoCl_2$.

RESULTS

TEM studies indicated that the products consisted of MWNTs and Fe nanoparticles encapsulated in graphitic shells. The Fe nanoparticles were spherical in shape and encapsulated completely in graphitic shells. They were similarly resistant to oxidation by air and strong acid, indicating complete encapsulation.

EXAMPLE 8

The procedures for Example 1 were followed by substituting 10 mole % $FeCl_3$ for 2 mole % $FeCl_3$ as Example 7.

RESULTS

TEM indicated that by increasing the percentage of $FeCl_3$ catalyst from 5 to 10%, the yield of Fe nanoparticles encapsulated in graphitic shells increased. The yield of nanotubes remained fairly constant.

EXAMPLE 9

The procedure of Example 1 was followed with the exception that no catalyst was used.

RESULTS

TEM and X-ray diffraction studies indicated that the product was graphite only.

EXAMPLE 10

The procedure of Example 1 was followed by substituting polytetrafluoroethylene for the halogenated carbon compound, hexachloroethane.

RESULTS

TEM indicated the synthesis of MWNTs, SWNTs, and Co nanoparticles encapsulated in a graphitic shell.

EXAMPLE 11

The procedure of Example 1 was followed by substituting a copolymer of polyvinylidene chloride and polyvinylchloride for the halogenated carbon compound, hexachloroethane.

RESULTS

TEM indicated the synthesis of MWNTs, SWNTs, and Co nanoparticles encapsulated in a graphitic shell.

EXAMPLE 12

The procedure of Example 1 was followed by substituting a copolymer of polyvinylidene chloride and polyvinylchloride for the halogenated carbon compound, hexachloroethane and substituting 10 mole % $FeCl_3$ for the 5 mole % $CoCl_2$.

RESULTS

TEM indicated the synthesis of MWNTs, SWNTs, and Fe nanoparticles encapsulated in a graphitic shell. All of the Fe nanoparticles appeared to be completely encapsulated in graphitic shells when this halogenated hydrocarbon was used in lieu of hexachloroethane.

EXAMPLE 13

In this example 0.0052 moles of magnesium was reacted with 0.0026 moles of carbon tetrabromide ($CBr_4$) in the presence of 0.0011 moles (10 atomic percent) of $CoCl_2$ catalyst as given in equation (3). 0.5 moles of $N(CH_3)_4Br$ was added to the reaction mixture, as an inert salt additive to control the reaction temperature.

$$CBr_4 + 2Mg \rightarrow C + 2MgBr_2 \tag{3}$$

RESULTS

TEM results indicated the product was MWNTs and Co nanoparticles encapsulated in graphitic shells.

EXAMPLE 14

The procedures of Example 1 were followed by substituting an halogenated hydrocarbon, hydrocarbon, or halogenated carbon compound for the halogenated hydrocarbon, hexachloroethane, by substituting a metal or metal carbon compound for lithium acetylide, or a combination thereof.

EXAMPLE 15

The procedures in Example 1 were followed by reacting lithium acetylide ($Li_2C_2$) with carbon tetrabromide ($CBr_4$) as given in equation (4):

$$CBr_4 + 2Li_2C_2 \rightarrow 5C + 4LiBr \tag{4}$$

The calculated maximum reaction temperature was 1745° C.

EXAMPLE 16

The procedures in Example 1 were followed by reacting hexachloroethane ($C_2Cl_6$) with magnesium as given in equation (5):

$$C_2C_6 + 3Mg \rightarrow 2C + 3MgCl_2 \tag{5}$$

The calculated maximum reaction temperature was 4111° C.

EXAMPLE 17

The procedures in Example 1 can be followed by substituting a polymer carbon halide, such as polyvinylidene chloride, polyvinyl chloride, or polytetrafluoroethylene, for the carbon halide hexachloroethane.

EXAMPLE 18

The procedures of Examples 1 to 9 can be followed with the addition of an inert salt additive, such as NaCl or LiCl, to lower the reaction temperature.

The following references are incorporated herein by reference: Ebbeson, T. W., et al., Nature, Vol. 358:220–222 (1992); Rodriguez, N. M., et al., Langmuir, Vol., 11:3862–3866 (1995); Bethune, D. S., et al., Nature, Vol. 363:605–607 (1993); Iijima, S., et al., Nature, Vol. 363: 603–605 (1993); Kiang, C.-H., et al., J. Phys. Chem. Solids, Vol. 57:35–39 (1995); Kiang, C.-H., et al., J. Phys. Chem., Vol. 98: 6612–6618 (1994); Kiang, C.-H., et al., Carbon, Vol. 33: 903–914 (1995); Kiang, C.-H., et al., Chem. Phys. Left., Vol. 259:41–47 (1996); Journet, C., et al., Nature, Vol. 388:756–758 (1997); Guo, T., et al., Chem. Phys. Left., Vol. 243:49–54 (1995); Thess, A., et al., Science, Vol. 273:483–487 (1996); Maser, W. K., et al., Chem. Phys. Left., Vol. 292:587–593 (1998); Cheng, H. M., et al., Appl.Phys.Lett., Vol. 72:3282–3284 (1998); Hafner, J. H., et al., Chemical Physics Letters, Vol. 296:195–202 (1998); Dillon, A. C., et al., "Storage of hydrogen in single-walled carbon nanotubes", Nature, Vol. 386:377–379 (1997); Sloan, J., et al., "The opening and filling of single walled carbon nanotubes (SWTs)," Chem. Commun., Vol. 3:347–348 (1998); Jiao, J., et al., Journal of Applied Physics, Vol. 80:103–108 (1996); U.S. Pat. No. 5,456,986 to Majetich, et al.; U.S. Pat. No. 5,783,263 to Dravid, et al.; U.S. Pat. No. 5,780,101 to Nolan, et al.; Gillan, E. G., et al., Chem of Matter, Vol. 8:333–343 (1996); U.S. Pat. No. 5,110,768 to Kaner, et al.; Wiley, J. B., et al., Science, Vol. 255:1093–1097 (1992)]. U.S. Pat. No. 5,474,591 to Wells, et al.; Dekker, C., "Carbon Nanotubes as Molecular Quantum Wires", Physics Today, Vol. 52: 22–28 (1999); Ebbeson, T. W., "Carbon Nanotubes", Physics Today, Vol. 49:26–32 (June 1996); Han, S., et al., Science, Vol. 277:1287 (1997); Vietze, U., et al., "Zeolite-Dye Microlasers", Phys. Rev. Lett., Vol. 81:4628–4631 (1998); Service, R. F., Science, Vol. 281:940–942 (1998); and Heremans, J., et al., "Magnetoresistance of bismuth nanowire arrays: A possible transition from one-dimensional to three-dimensional localization," Phys. Rev. B 58: R10091 (1998); Tans, S. J., et al., "Room-temperature transistor based on a single carbon nanotube", Nature, Vol. 393:49–52 (1998); Dillon, A. C., et al., "Storage of hydrogen in single-walled carbon nanotubes", Nature, Vol. 386: 377–379 (1997); Wong, S. S., et al., "Covalently functionalized nanotubes as nanometer-sized probes in chemistry and biology," Nature, Vol. 394: 52–55 (1998); and Yakobson, B., et al., "Fullerene Nanotubes: $C_{1,000000}$ and Beyond," American Scientist, Vol. 85:324–337 (1997).

Although the foregoing invention has been described in some detail by way of illustration and example for purposes of clarity and understanding, it will be obvious that various modifications and changes which are within the knowledge of those skilled in the art are considered to fall within the scope of the appended claims.

What is claimed is:

1. A displacement process for preparing a form of carbon comprising:
    reacting a carbon compound with a compound containing metal and carbon in the presence of a catalytically effective amount of catalyst, thereby producing a form of carbon selected from the group consisting of nanotubes, encapsulated metal, or a combination thereof.

2. The process of claim wherein said carbon compound is a halogenated hydrocarbon, a halogenated carbon or a hydrocarbon.

3. The process of claim 2, wherein said halide is selected from the group consisting of fluorine, chlorine, bromine, and iodine.

4. The process of claim 1, wherein said carbon compound is hexachloroethane.

5. The process of claim 1, wherein said metal compound is capable of forming a salt.

6. The process of claim 1, wherein said metal compound comprises an element selected from the group consisting of Group 1 elements Li, Na, K, Rb, and Cs; Group 2 elements Be, Mg, Ca, Sr, and Ba, and Group 13 elements B, Al, Ga, In, and Tl.

7. The process of claim 6, wherein said metal carbide is lithium acetylide.

8. The process of claim 7, wherein said catalyst is $CoCl_2$.

9. The process of claim 1, wherein said metal compound is a metal carbide.

10. The process of claim 1, wherein said catalyst is selected from the group consisting of $CoCl_2$, $NiCl_2$, or $FeCl_3$.

11. The process of claim 10, wherein said effective amount is 5 mole % based on the moles of total carbon in the carbon compound and compound containing metal and carbon.

12. The process of claim 1, further comprising heating the reaction, thereby initiating the reaction.

13. The process of claim 1, further comprising adding a salt to the reaction.

14. The process of claim 13, wherein the salt is NaCl or LiCl.

15. The process of claim 1, wherein the nanotubes are single-walled.

16. The process of claim 1, wherein the nanotubes are multi-walled.

17. A displacement process for preparing a form of carbon comprising reacting a carbon compound with a compound containing metal and carbon in the presence of a catalytically effective amount of catalyst so as to produce carbon nanotubes.

* * * * *